United States Patent [19]
Ferrario

[11] 3,789,170
[45] Jan. 29, 1974

[54] CONDUCTING FLUID TYPE INERTIA RESPONSIVE SWITCH FOR MOTOR VEHICLES

[76] Inventor: Franco Ferrario, Via Lombardia 1, Trezzo Sull Adda, Italy

[22] Filed: June 12, 1972

[21] Appl. No.: 263,716

[30] Foreign Application Priority Data
June 19, 1971  Italy.................................. 26084/71
Sept. 7, 1971  Italy.................................. 28341/71

[52] U.S. Cl........ 200/61.47, 200/61.45 M, 200/229
[51] Int. Cl.......................................... H01h 35/14
[58] Field of Search. 200/61.45 M, 61.47, 220, 221, 200/226, 227, 228, 232; 335/47–58

[56] References Cited
UNITED STATES PATENTS
3,599,745  8/1971  Hughes......................... 200/61.47 X
2,918,545  12/1959  Von Bomhard............. 200/61.47 X FOREIGN PATENTS OR APPLICATIONS
387,509  2/1933  Great Britain................... 200/61.47
1,248,086  9/1962  France............................ 200/61.47

Primary Examiner—James R. Scott
Attorney, Agent, or Firm—Dr. Guido Modiano; Dr. Albert Josif

[57] ABSTRACT

An antomatic cutout switch for motor vehicles, comprising a container of insulating material having a first compartment of vertical axis. A second compartment surrounding the first one is in communication with the first compartment. The first compartment has a pair of conductors at a certain distance apart from one another and being provided with terminals one of which is connected to a pole of an electric current source for the motor vehicle. The first compartment contains mercury normally in contact with the ends of said conductors which appear there so as to form the electrical contact between them.

3 Claims, 3 Drawing Figures

PATENTED JAN 29 1974 3,789,170

CONDUCTING FLUID TYPE INERTIA RESPONSIVE SWITCH FOR MOTOR VEHICLES

BACKGROUND OF THE INVENTION

The present invention relates to an automatic cutout switch, which serves for interrupting the flow of current in the electrical circuit of a motor vehicle in the case of accidents such as collisions, overturning and the like.

SUMMARY OF THE INVENTION

The main object of the present invention is to provide a current switch of reliable automatic operation having structural and functional characteristics which render it capable of instantaneously interrupting the flow of current in the electrical system of any vehicle, in the case of road accidents. A further object of this invention is to provide a switch of the foregoing type which enables the electrical system to be rapidly re-energised after an accident when the vehicle is able to resume running.

A further object is to provide an automatic switch able to actuate suitable signals for facilitating sighting of the vehicle involved in the accident by those who reach it and for signalling the danger.

These and further objects are attained by an automatic cutout switch for motor vehicles, comprising a container of insulating material having normally upperly at least one cover which normally removably choses it and having internally walls separated from said cover so as to leave a space between the top of them and the cover and defining a first compartment of normally vertical axis substantially free from curves and open towards said space, and a second compartment also open upperly towards said space and in communication by way of it with said first compartment, said first compartment having a bottom whose level is lower than the level of the bottom of the second compartment, at least a first group of conductors having one set of ends appearing in said first compartment at a certain distance apart and being provided with terminals at least one of which can be connected to a pole of an electric current source for the motor vehicle, said first compartment containing mercury normally in contact with the ends of said conductors which appear there so as to form the electrical contact between them.

It has been found that considerable advantages are obtained when the first compartment is chosen in such a manner as to have a substantially straight axis, i.e. free from bends or recesses or ramifications, for example of vertical tubular form of any cross-section, preferably circular. Tests have been made with regard to this and it has been found that if the first compartment is chosen in the form of a U or with branches, it is not possible to obtain satisfactory results. It has been found that in a compartment of U form, ie with two openings which emerge in the space above the first compartment, at the moment of a violent collision, the mercury does not in fact flow out through one of the openings of the U compartment, as at first sight it would appear that it should, but instead the mercury separates into a number of parts in the compartment and tends to flow from both openings thereby fractionating its impact capability whereas that part of the mercury situated in the elbow zone of the U form collides with the roof formed by the elbow zone, and falls down instead of egressing upwardly. It has consequently been ascertained that satisfactory operation with the first compartment in the form of a U is impossible, and this also applies to compartments with various branches.

Advantageously the first compartment is upperly closed by a means of at least partial interception, which may for example consist of a tubular extension possibly bent downwards, but which advantageously consists of a calibrated magnetic attraction cap. It has in fact been found that during normal vibrations and oscillations of the motor vehicle, mercury globules are formed which tend to separate from the mass contained in the first compartment and flow into the second compartment. From the tests it has been ascertained that in a short time the quantity of mercury in the first compartment is reduced to such an extent in the section through which current passes that the mercury becomes excessively heated with imaginable consequences, in addition to the operation of the auxiliary contacts as explained hereinafter. The said calibrated magnetic attraction cap is consequently very important to the solution of this problem. The calibration of the magnetic attraction of the cap is made with care in order to obtain the best operational and most reliable results.

BRIEF DESCRIPTION OF THE DRAWING

Further characteristics and advantages of the invention will be more evident from the detailed description of a preferred but not exclusive embodiment of the automatic switch according to the invention, illustrated by way of example in the accompanying drawing in which.

DESCRIPTION OF THE PREFERRED EMBODIMENT

Figure 1:
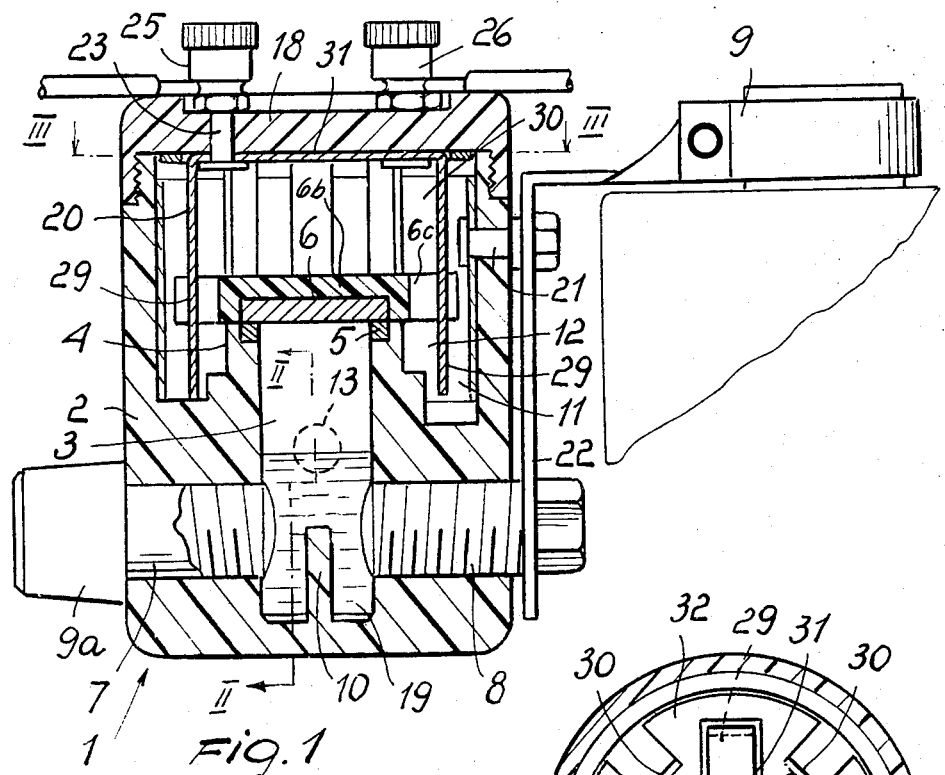
FIG. 1 is a section through the automatic switch according to the invention.
Figure 3:
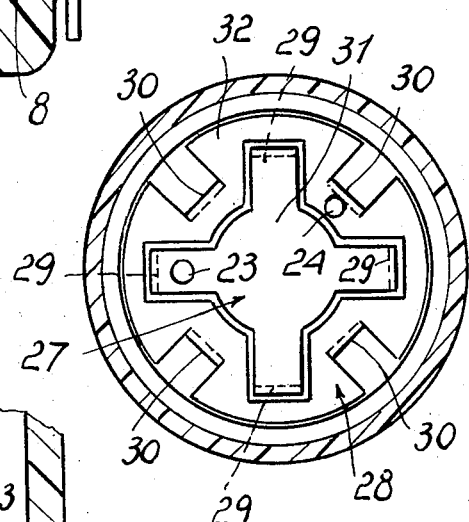
FIG. 3 is a section on the line III—III of FIG. 1.

With reference to the foregoing figures, the automatic switch, indicated generally by the reference numeral 1, comprises a container or housing 2 of electrically insulating material. The container 2 comprises a first compartment 3 of cylindrical form, open at its upper end or top and provided there with a neck 4 on the edge of which is a metal ring 5 on which rests a magnetized disc 6 acting as a cap or lid and embedded in a support of plastics 6b provided with four or more guiding teeth 6c. By a suitable choice of magnetised masses the closing force for the cap may be calibrated. The neck 4 constitutes a wall portion defining said first compartment and having a cylindrical inner surface, as clearly visible from the drawing.

Figure 2:
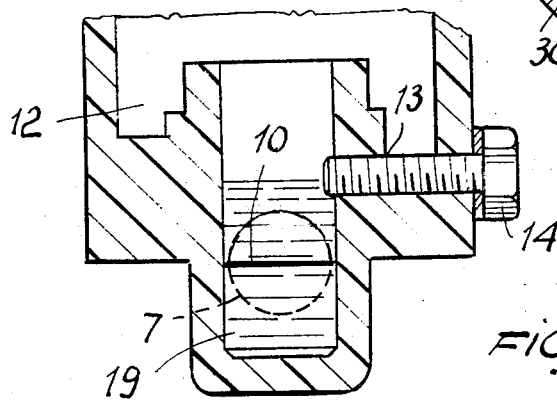
FIG. 2 is a partial section of the line II—II of FIG. 1.

In the zone close to the bottom of the lateral surface of the compartment 3 appear two metal elements or electrical contact members 7 and 8, embedded into said body 2, and connected externally to electrical terminals 9, 9a, one of which is connected usually to the positive pole of the battery or accumulator or other source of electrical energy for the motor vehicle; and the other 9a to the main cable feeding current to the electrical system of the motor vehicle. In a position above that of said cylindrical cavity 3, the body 2 comprises a second compartment 11, also cylindrical, of a diameter greater than that of the cavity 3 and positioned in such a manner as to form about the neck 4 an annular channel 12, whose annular bottom degrades towards a bore or passage 13 (FIG. 2), which is in communication with it and closed by a screw 14, and which opens into the cavity 3.

The lateral wall of the compartment 11 is lined with a metal jacket 20, which is fixed and connected electrically by way of a metal rivet or screw 21 to the plate 22 forming part of the terminal 9 of the conductor 8. The jacket 20 and the rivet 21 form contact members for the mercury contained in the compartment 11 under emergency conditions.

On the lower side of the cover 18 are fixed, by means of metal rivets or screws 23 and 24 connected to respective terminals 25 and 26, reversed basket shape rod like contacts 27 and 28 insulated from one another respectively, comprising contact spikes 29 and 30 respectively, disposed in polygonal positions and extending downwards from respective support plates 31 and 32. The terminals 25 and 26 may be connected to alarm signal apparatus of any type, either luminous, acoustic, radio wave or general electromagnetic.

These terminals are preferably connected by means of a separate emergency circuit to the stop signal and the warning horn of the vehicle.

In the lower part of the first compartment 3 there is normally a mass of mercury 19 present, which extends to such a level as to completely cover the metal elements or contact members 7 and 8, so that said elements 7 and 8 are in electrical contact. The bottom of the compartment 3 is on a lower level than that of the electrodes 7 and 8 and on the bottom a partition 10 may be provided extending upwardly not beyond the axis of the electrodes 7 and 8. The purpose is to avoid that small quantities of mercury remaining in the compartment after the expulsion may close the contact between the electrodes.

The operation of the automatic switch according to the invention is as follows.

The switch is firstly connected into the electrical circuit of a motor vehicle as shown for example in FIG. 1.

In the case of an accident (collision, overturning, running off the road) the vehicle will obviously be subjected to impact.

This latter also acts on the mass of mercury 19, which by its own impact force opens the calibrated magnetic cap at a given impact force and instantly flows out of the cavity 3, so interrupting the circulation of current. In this manner the mercury, which has flown out of the cavity 3 and flown into the cavity 11, puts into contact the circular jacket 20 with the spikes of the basket contacts 27 and 28, which are connected to terminals 25 and 26 to which arrives thus the electric current.

The electric current reaching the compartment 11 could also be supplied by an auxiliary source of current, other than that of the motor vehicle. In such case in the emergency circuit a lower voltage current could be supplied (e.g. 2 volts) for special acoustic or other visible signaling apparatus.

The main electrical circuit of the vehicle involved in the accident may be re-energised by connecting the annular channel 12, into which the mercury from the cavity 3 has flown, to said cavity 3 by opening the bore 13 by rotating the screw 14 in its seat and screwing it on again after the mercury has flown in the cavity 3. The screw 14 constitutes thus a means for normally maintaining the bore or passage 13 closed.

I claim:

1. An automatic cutout switch for motor vehicles, comprising a housing at least partially of non conducting material and mountable in a fixed position on said motor vehicle, said housing having a normally vertical axis, a closed lower end portion and an open upper end portion, a cover removably mounted on said housing for closing said open upper end within said housing: first wall means defining a first compartment for mercury having a closed bottom portion and an open top portion, said first wall means having a first wall portion thereof surrounding said first compartment and extending parallel to said vertical axis from said bottom portion upwardly and terminating with said open top end thereof at a distance below said open upper end portion said first wall portion having a surface facing said first compartment said surface being cylindrical and extending parallel to said vertical axis, second wall means defining a second compartment having an annular bottom surrounding said open top portion of said first compartment, said annular bottom being at a higher level than the bottom portion of said first compartment and at a lower level than the open top portion of said first compartment, the upper end of said second compartment coinciding with the upper open end of said housing, a lid normally closing said open top portion of said first compartment normally to prevent leakage of mercury therefrom, biasing means yieldably urging said lid into its closing position, said biasing means providing a pre-established closing force acting on said lid, and yieldable under the action of a pre-established impact intensity created under emergency conditions, guide means for said lid for guiding said lid from an open position thereof into its closing position under the action of said biasing means, a pair of electrically conducting contact members opening into said first compartment at opposite sides thereof at a distance from each other, thereby to allow the mercury contained in said first compartment to provide the only electrical contact between said contact members, one of said contact members being connectable to one of the terminals of the electrical power source of the motor vehicle and the other of said contact members being connectable to an electrical current distribution cable, normally closed passage means allowing, in open condition, communication between said bottom portion of the first compartment and said annular bottom of said second compartment thereby to allow mercury temporary contained in said second compartment to flow into said first compartment, and removable means for maintaining said passage means normally in closed conditions.

2. A switch according to claim 1, further comprising a third electrical contact member opening into said second compartment and electrically connected with said one of the terminals of the electrical power source and electrical contact rods fixed on said cover and extending therefrom into said second compartment thereby to contact the mercury contained under emergency conditions within said second compartment and providing electrical connection between said third electrical contact member and said electrical contact rods, said electrical rods being electrically connectable to emergency circuits wires.

3. A switch according to claim 1, wherein said biasing means comprise en edge portion of said open top portion and at least one body portion of said lid, one of said edge and body portions being made of magnetic material and the other of said edge and body portions being made of magnetized material.

* * * * *